(12) United States Patent
Dalwani et al.

(10) Patent No.: US 10,035,108 B2
(45) Date of Patent: Jul. 31, 2018

(54) MEMBRANES

(71) Applicants: Fujifilm Manufacturing Europe B.V., Tilburg (NL); Fujifilm Corporation, Tokyo (JP)

(72) Inventors: Mayur Dalwani, Tilburg (NL); Shigehide Itoh, Tilburg (NL); Erik Vermeer, Tilburg (NL); Maarten Meijlink, Tilburg (NL); Yujiro Itami, Tilburg (NL)

(73) Assignees: Fujifilm Manufacturing Europe B.V. (NL); Fujifilm Corporation (JP)

( * ) Notice: Subject to any disclaimer, the term of this patent is extended or adjusted under 35 U.S.C. 154(b) by 130 days.

(21) Appl. No.: 15/026,979

(22) PCT Filed: Sep. 30, 2014

(86) PCT No.: PCT/GB2014/052947
§ 371 (c)(1),
(2) Date: Apr. 3, 2016

(87) PCT Pub. No.: WO2015/049504
PCT Pub. Date: Apr. 9, 2015

(65) Prior Publication Data
US 2016/0256834 A1 Sep. 8, 2016

(30) Foreign Application Priority Data

Oct. 3, 2013 (GB) .................... 1317525.2

(51) Int. Cl.
| | | |
|---|---|---|
| *B01D 69/12* | (2006.01) | |
| *B01D 53/22* | (2006.01) | |
| *B01D 69/10* | (2006.01) | |
| *B01D 69/02* | (2006.01) | |
| *B01D 71/32* | (2006.01) | |
| *B01D 71/64* | (2006.01) | |

(52) U.S. Cl.
CPC .......... *B01D 69/12* (2013.01); *B01D 53/228* (2013.01); *B01D 69/02* (2013.01); *B01D 69/105* (2013.01); *B01D 71/32* (2013.01); *B01D 71/64* (2013.01); *B01D 2323/30* (2013.01); *B01D 2323/345* (2013.01); *B01D 2325/04* (2013.01)

(58) Field of Classification Search
CPC ...... B01D 53/22; B01D 53/228; B01D 69/02; B01D 69/105; B01D 69/12; B01D 71/32; B01D 71/64; B01D 2325/04
See application file for complete search history.

(56) References Cited

U.S. PATENT DOCUMENTS

| | | | |
|---|---|---|---|
| 3,899,309 A | 8/1975 | Hoehn et al. | |
| 4,374,891 A * | 2/1983 | Ward, III | B01D 69/122 |
| | | | 428/220 |
| 4,464,494 A | 8/1984 | King et al. | |
| 4,581,043 A | 4/1986 | van der Scheer | |
| 5,286,280 A * | 2/1994 | Chiou | B01D 53/228 |
| | | | 427/412.1 |
| 5,733,663 A | 3/1998 | Scheunemann et al. | |
| 5,817,235 A | 10/1998 | Tortosa | |
| 5,837,032 A * | 11/1998 | Moll | B01D 53/22 |
| | | | 95/45 |
| 6,356,605 B1 | 3/2002 | Hosur et al. | |
| 6,536,605 B2 * | 3/2003 | Rice | B01D 69/10 |
| | | | 210/490 |
| 9,731,248 B2 * | 8/2017 | Umehara | B01D 69/12 |
| 2007/0009776 A1 * | 1/2007 | Nodono | B01D 69/12 |
| | | | 521/27 |
| 2011/0009506 A1 | 1/2011 | Lee et al. | |
| 2011/0036237 A1 * | 2/2011 | Okada | B01D 69/10 |
| | | | 95/51 |

(Continued)

FOREIGN PATENT DOCUMENTS

| | | |
|---|---|---|
| CN | 101732997 A | 6/2010 |
| EP | 134055 A2 | 3/1985 |

(Continued)

OTHER PUBLICATIONS

International Preliminary Report on Patentability issued in corresponding International Application No. PCT/GB2014/052947, dated Apr. 5, 2016.
International Search Report and Written issued in corresponding International Application No. PCT/GB2014/052947, dated Mar. 3, 2015.
Peter et al., "Multilayer composite membranes for gas separation based on crosslinked PTMSP gutter layer and partially crosslinked Matrimid TM 5218 selective layer" Journal of Membrane Science, vol. 340, pp. 62-72, 2009.
Yave et al., "Nanometric thin film membranes manufactured on square meter scale: ultra-thin films for CO2 capture", Nanotechnology vol. 21, pp. 7, 2010.

(Continued)

*Primary Examiner* — Jason M Greene
(74) *Attorney, Agent, or Firm* — Banner & Witcoff, Ltd.

(57) ABSTRACT

A composite membrane comprising: a) a porous support; b) a gutter layer; and c) a discriminating layer which satisfies Formula (1): wherein: Ø is <4; x is the arithmetic mean of N measurements of the thickness of the discriminating layer and has a value of between 30 and 150 nm; N is at least 100; $x_{low\_meas}$ is the thickness in nm of an individual measurement of thickness within the N measurements; $x > x_{low\_meas} > 0$; and n is the number of individual thickness measurements where $x > x_{row\_meas}, > 0$ $$\emptyset = \frac{\bar{x}}{(N-n)}\left(n - \sum_{i=1}^{n}\left(1 - \frac{1}{x_{low_{meas}}}\right)\right) \quad \text{Formula (1)}$$

15 Claims, No Drawings

(56) References Cited

U.S. PATENT DOCUMENTS

| | | | | |
|---|---|---|---|---|
| 2012/0043272 A1* | 2/2012 | Yoshida | ................. | B01D 69/12 |
| | | | | 210/457 |
| 2012/0058302 A1* | 3/2012 | Eggenspieler | ......... | B01D 69/12 |
| | | | | 428/141 |
| 2014/0174293 A1 | 6/2014 | Yamanaka et al. | | |
| 2015/0273399 A1* | 10/2015 | Roh | .................... | B01D 69/125 |
| | | | | 427/243 |

FOREIGN PATENT DOCUMENTS

| | | |
|---|---|---|
| JP | 2005224718 A | 8/2005 |
| JP | 2006136839 A | 6/2006 |
| WO | 2014001790 A1 | 1/2014 |
| WO | 2014001791 A1 | 1/2014 |
| WO | 2014001792 A1 | 1/2014 |

OTHER PUBLICATIONS

Zhou et al., "Perfluorocyclobutyl polymer thin-film composite membranes for CO2 seperations", Journal of Membrane Science vol. 450, pp. 478-486, 2014.

\* cited by examiner

MEMBRANES

RELATED APPLICATION DATA

This application is a National Stage Application under 35 U.S.C. 371 of co-pending PCT application number PCT/GB2014/052947 designating the United States and filed Sep. 30, 2014; which claims the benefit of GB application number 1317525.2 and filed Oct. 3, 2013 each of which are hereby incorporated by reference in their entireties.

This invention relates to composite membranes and to their preparation and use for the separation of gases.

Composite gas separation membranes are known from U.S. Pat. No. 5,286,280 ('280). The '280 membranes comprise, in order, a support, a gas-permeable polymeric layer (often referred to as a "gutter layer"), a discriminating layer and optionally an outer protective layer.

U.S. Pat. No. 6,356,605 ('605) describes reverse osmosis membranes prepared by slot die coating which can provide a coating coverage accuracy of +/−1% of the targeted coverage. However the membrane supports of '605 do not comprise porous non-woven and/or gutter layers.

There is a need for robust membranes which can operate at high pressures with good gas flux and/or good discrimination between gases such as $CO_2$ and $CH_4$.

According to a first aspect of the present invention there is provided a composite membrane comprising:
a) a porous support;
b) a gutter layer; and
c) a discriminating layer which satisfies Formula (1):

$$\emptyset = \frac{\bar{x}}{(N-n)}\left(n - \sum_{i=1}^{n}\left(1 - \frac{1}{x_{low\_meas}}\right)\right) \quad \text{Formula (1)}$$

wherein:
$\emptyset$ is <4;
$\bar{x}$ is the arithmetic mean of N measurements of the thickness of the discriminating layer and has a value of between 30 and 150 nm;
N is at least 100;
$x_{low\_meas}$ is the thickness in nm of an individual measurement of thickness within the N measurements;
$\bar{x} > x_{low\_meas} > 0$; and
n is the number of individual thickness measurements where $\bar{x} > x_{low\_meas} > 0$ In our studies we have found that in the case of 'thin' discriminating layers (i.e. those having an average thickness ($\bar{x}$) of 30 to 150 nm), variations in the thickness of discriminating layer have a significant impact on the ability of the discriminating layer to distinguish between gases, much more so than is the case when thicker discriminating layers are used. Furthermore, by controlling $\emptyset$ to have a value of <4, the selectivity of the 'thin' membranes is greatly improved, especially when separating $CO_2$ and $CH_4$ gases. In contrast, when 0 is 4 or more such membranes have lower selectivity.

The purpose of the porous support is to provide mechanical strength to the composite membrane without materially reducing the flux. Therefore the porous support is typically open pored, relative to the discriminating layer.

The porous support may be, for example, a microporous organic or inorganic membrane, or a woven or non-woven fabric.

The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the gutter layer and the discriminating layer on the already cured porous support.

The porous support is not limited to sheet form; also porous supports in tubular form can be used.

One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably possesses pores which are as large as possible, consistent with providing a smooth surface for the gutter layer and subsequent discriminating layer. The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 µm, preferably 0.01 to 1 µm. The pores at the surface of the porous support will typically have a diameter of 0.001 to 0.1 µm, preferably 0.005 to 0.05 µm.

The pore diameter may be determined by, for example, viewing the surface of the porous support by scanning electron microscopy ("SEM") or by cutting through the support and measuring the diameter of the pores within the porous support, again by SEM.

The porosity at the surface of the porous support may also be expressed as a % porosity, i.e.:

$$\% \text{ porosity} = 100\% \times \frac{(\text{area of the surface which is missing due to pores})}{(\text{total surface area})}$$

The areas required for the above calculation may be determined by inspecting the surface of the porous support by SEM.

Thus, in a preferred embodiment, the porous support has a % porosity >1%, more preferably >3%, especially >10% and more especially >20%.

The porosity of the porous support may also be expressed as a $CO_2$ gas permeance (units are $m^3(STP)/m^2 \cdot s \cdot kPa$).

When the composite membrane is intended for use in gas separation the porous support preferably has a $CO_2$ gas permeance of 5 to $150 \times 10^{-5}$ $m^3$(STP)/$m^2 \cdot s \cdot kPa$, more preferably of 5 to 100, most preferably of 7 to $70 \times 10^{-5}$ $m^3$(STP)/$m^2 \cdot s \cdot kPa$.

Alternatively the porosity is characterised by measuring the $N_2$ gas flow rate through the porous support. Gas flow rate can be determined by any suitable technique, for example using a Porolux™ 1000 device, available from porometer.com.

Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 $cm^2$ (effective diameter of 18.5 mm) is preferably >1 L/min, more preferably >5 L/min, especially >10 L/min, more especially >25 L/min.

The higher of these flow rates are preferred because this reduces the likelihood of the gas flux of the resultant composite membrane being reduced by the porous support.

The abovementioned % porosity and permeance refer to the porous support used to make the composite membrane (i.e. before the gutter layer and any other layers have been applied thereto).

The porous support preferably has an average thickness of 20 to 500 µm, preferably 50 to 400 µm, especially 100 to 300 µm.

The gutter layer performs the function of providing a smooth and continuous surface for the discriminating layer. Preferably the gutter layer comprises dialkylsiloxane groups.

The gutter layer preferably has an average thickness 25 to 1200 nm, preferably 30 to 800 nm, especially 50 to 650 nm, e.g. 70 to 120 nm, 130 to 170 nm, 180 to 220 nm, 230 to 270 nm, 300 to 360 nm, 380 to 450 nm, 470 to 540 nm or 560 to 630 nm.

The thickness of the gutter layer may be determined by cutting through the membrane and examining its cross section by SEM. The part of the gutter layer which is present within the pores of the support is not taken into account.

The gutter layer is preferably non-porous, i.e. any pores present therein have an average diameter <1 nm, although it is gas permeable and usually has a low ability to discriminate between gases.

Dialkylsiloxane groups may be incorporated into the gutter layer by using a polymerisable dialkylsiloxane as one of the components of a curable composition used to form the gutter layer. The polymerisable dialkylsiloxane (which may alternatively be referred to as a polymerisable compound comprising dialkylsiloxane groups) is optionally a monomer having a dialkylsiloxane group or a polymerisable oligomer or polymer having dialkylsiloxane groups. For example, one may prepare the gutter layer from a radiation-curable composition containing a partially crosslinked, radiation-curable polymer comprising dialkylsiloxane groups, as described in more detail below. Typical dialkylsiloxane groups are of the formula —{O—Si($CH_3$)$_2$}$_n$— wherein n is at least 1, e.g. 1 to 100. Poly(dialkylsiloxane) compounds having terminal vinyl groups are also available and these may be incorporated into the gutter layer by a polymerisation processes.

Preferably the gutter layer is free from groups of formula Si—$C_6H_5$.

Preferably the gutter layer comprises groups of formula —O—CO—$(CH_2)_n$—Si—C($OR^1$)$_2$— wherein n is from 1 to 3 (preferably 2) and $R^1$ is $C_{1-4}$-alkyl (preferably methyl). Such groups may be incorporated into the gutter layer through the use of appropriate monomers, for example monomers comprising two groups of formula $HO_2C$—$(CH_2)_n$—Si—C($OR^1$)$_2$— (wherein n and $R^1$ are as hereinbefore defined). Such monomers can act as crosslinking agents for polyepoxy compounds and are commercially available, for example X-22-162C from Shin-Etsu Chemical Co.

Irradiation of a curable composition (sometimes referred to as "curing" in this specification) to form the gutter layer may be performed using any source which provides the wavelength and intensity of radiation necessary to cause the radiation-curable composition to polymerise and thereby form the gutter layer on the porous support. For example, electron beam, ultraviolet (UV), visible and/or infra red radiation may be used to irradiate (cure) the radiation-curable composition, with the appropriate radiation being selected to match the components of the composition.

Preferably irradiation of a radiation-curable composition used to form the gutter layer begins within 7 seconds, more preferably within 5 seconds, most preferably within 3 seconds, of the radiation-curable composition being applied to the porous support.

Suitable sources of UV radiation include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are UV emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

Optionally one may apply a radiation-curable composition to the porous support, then irradiate the radiation-curable composition to form the gutter layer and then apply the discriminating layer thereto. Alternatively, one may apply the radiation-curable composition to the porous support and apply the discriminating layer (or the chemicals used to prepare the discriminating layer) on top of the radiation-curable composition and then perform the irradiation step for both layers simultaneously.

With suitable coating techniques, coating speeds of at least 5 m/min, e.g. at least 10 m/min or even higher, such as 15 m/min, 20 m/min, or even up to 100 m/min, can be reached. In a preferred embodiment the composition used to form the gutter layer (and also the compositions used to form the discriminating layer and the protective layer, when present) is applied to the support at one of the aforementioned coating speeds.

The surface of the gutter layer is preferably activated by corona treatment, plasma treatment (e.g. at or below atmospheric pressure, e.g. in a vacuum), flame treatment and/or ozone treatment. For the corona or plasma treatment generally an energy dose of 0.5 to 100 $kJ/m^2$ will be sufficient, for example about 1, 3, 5, 8, 15, 25, 45, 60, 70 or 90 $kJ/m^2$.

In one embodiment the gutter layer is present on the porous support and does not permeate into the support to any significant extent. However in a preferred embodiment a portion of the gutter layer is present within the support and a portion of the gutter layer is outside of the support and the following conditions are satisfied:

(i) the portion of the gutter layer outside of the support has an average thickness ($GL_e$) of 10 nm to 900 nm; and
(ii) the portion of the gutter layer present within the support has an average thickness ($GL_i$) of 10% to 350% of $GL_e$.

$GL_e$ is preferably 200 to 900 nm, more preferably 400 to 900.

Preferably $GL_i$ has a value of 10% to 200% of $GL_e$, more preferably 20% to 90% of $GL_e$.

The average thicknesses $GL_e$ and $GL_i$ may be determined by cutting through the composite membrane, measuring the thicknesses of the gutter layer within and outside of the support at several locations using a scanning electron microscope (SEM) and then calculating the average thicknesses.

In cases where it is difficult to determine where the various layers begin and end by SEM, one may instead use time-of-flight secondary ion mass spectrometry (ToF-SIMS) depth profiling. For example, when the discriminating layer diffuses into the gutter layer in a graduated manner, the point at which the gutter layer finishes may not be clearly defined and it may therefore be difficult to measure $DL_i$. In such cases, the point at which the discriminating layer is deemed to finish is the point at which the concentration of the discriminating layer in the gutter layer drops to 20%. The point at which the concentration of the discriminating layer in the gutter layer drops to 20% may be determined by ToF-SIMS depth profiling, for example using the conditions described in the Examples. In ToF-SIMS depth profiling, an ion gun is operated in the DC mode during the sputtering phase in order to remove material from the composite membrane surface, and the same ion gun or a second ion gun is operated in the pulsed mode for an acquisition phase. Depth profiling by ToF-SIMS allows monitoring of all species of interest simultaneously, and with high mass resolution and clearly shows the extent to which the discriminating layer intermixes with the gutter layer due to the change in chemical composition at that point. Similarly, ToF-SIMS depth profiling clearly shows the junction between the gutter layer and the porous support due to their very different chemical compositions. For gutter layers rich in silicon-containing compounds, the change in silicon content is a very good marker for the beginning and end of the gutter layer, even when the gutter layer has a heterogenous chemical composition due to different permeation rates of its precursor components. Also the beginning and end of the discriminating layer may similarly be determined. In discriminating layers containing fluorine or acetyl-groups, a significant fall in the fluorine content or acetyl-group content (as measured by ToF-SIMS depth profiling) indicates the end of the discriminating layer.

One may control the extent to which the gutter layer permeates into the support (e.g. the ratio of $GL_i$:$GL_e$) by any of a number of techniques. For example, when the gutter layer is obtained by curing a curable composition, one may appropriately select a curable composition viscosity and time delay between applying this composition to the porous support and curing. By varying the viscosity and/or time delay, one may also vary the % of the gutter layer which is present within the porous support (e.g. to ensure it is 10 to 350%).

One may control the overall thickness of the gutter layer ($GL_i$+$GL_e$) by controlling the solids content and the amount of curable composition applied to the porous support per unit area.

Another option for ensuring that the curable composition does not permeate excessively into the porous support (i.e. to keep the value of $GL_i$ low) is to increase the hydrodynamic radius (Rhyd) of a radiation-curable polymer used to form the gutter layer. Rhyd may be increased by increasing the extent to which the radiation-curable polymer is crosslinked. Rhyd can be suitably determined by dynamic light scattering.

The gutter layer usually has the function of providing a smooth and continuous surface for the discriminating layer. While it is preferred for the gutter layer to be pore-free, the presence of some pores usually does not reduce the permselectivity of the final membrane because the discriminating layer is often able to fill minor defects in the gutter layer.

The gutter layer is preferably essentially non-porous, i.e. any pores present therein have an average diameter <1 nm. This does not exclude the presence of defects which may be significantly larger. Defects may be corrected by the discriminating layer as described above.

Preferably $\bar{x}$ has a value of 35 to 130 nm, more preferably 40 to 100 nm.

The discriminating layer is located on the gutter layer. The discriminating layer preferably has pores of average diameter below 2 nm, preferably below 1 nm, and preferably is substantially non-porous. Preferably the discriminating layer has a very low permeability to liquids.

In one embodiment the discriminating layer is intermixed to some extent with the gutter layer. One may control the extent to which the discriminating layer is intermixed with the gutter layer by any of a number of techniques. For example, one may apply the discriminating layer to the gutter layer in the form of a solution comprising a solvent which partially dissolves or swells the gutter layer. In this way, the components which ultimately form the discriminating layer can permeate into the gutter layer to provide a region where the discriminating layer is intermixed with the gutter layer. By varying the amount of non-solvent and good solvent for the gutter layer, one may also vary the extent to which the discriminating layer intermixes with the gutter layer.

Similarly, when the composition used to form the discriminating layer is curable, one may control the extent to which the discriminating layer is intermixed with the gutter layer by controlling the amount of time the composition is in contact with the gutter layer before it is cured, e.g. by irradiation. When the composition is cured shortly after it has been applied to the gutter layer, the extent of intermixing is less than when the composition is cured after a longer time period in contact with the gutter layer.

A particularly good solvent-non-solvent pair for ensuring Ø is <4 and the extent to which the discriminating layer is intermixed with the gutter layer is methyl ethyl ketone (MEK) and tetrahydrofuran (THF). For many gutter layers, increasing the proportion of THF increases the % intermixing, while increasing the proportion of MEK decreases the % intermixing. By controlling the ratio of MEK:THF in the composition used to form the discriminating layer one may control Ø and also control the extent to which the discriminating layer is intermixed with the gutter layer from 10 and 100%. By this action we surprisingly observed a tremendous reduction of the value of Ø.

The % of the discriminating layer which is intermixed with the gutter layer is preferably the volume % (vol %). The average thicknesses of the portion of the discriminating layer which is not intermixed with the gutter layer may be referred to as $DL_e$. The average thicknesses of the portion of the discriminating layer which is intermixed with the gutter layer may be referred to as $DL_i$. Therefore one may determine the (vol.) % of the discriminating layer which is intermixed with the gutter layer by measuring $DL_i$ and $DL_e$ and performing the calculation $[DL_i/(DL_e+DL_i)] \times 100\%$.

Thus when the thickness DLi is 10% of the total thickness of the discriminating layer ($DL_e + DL_i$), then 10% of the discriminating layer is intermixed with the gutter layer. When $DL_e$ is 0 and $DL_i$ is >0, 100% of the discriminating layer is intermixed with the gutter layer.

According to a further aspect of the present invention there is process for preparing a composite membrane comprising the step of applying a discriminating layer to a laminate comprising a porous support and a gutter layer, characterised in that a tension >200 N/m is applied to the laminate when the discriminating layer is applied thereto.

Preferably the tension applied to the laminate when the discriminating layer is applied thereto is >250 N/m, more preferably >300 N/m, especially >330 N/m. Preferably the tension applied to the laminate when the discriminating layer is applied thereto is <750 N/m, more preferably <650 N/m, especially <500 N/m.

The aforementioned process is of great assistance in achieving the required value of Ø.

Preferably the composite membrane arising from the process is as defined in the first aspect of the present invention.

In the process of this further aspect of the present invention, preferably the discriminating layer is applied to the laminate by a process comprising applying a composition comprising a polymer, a solvent and optionally an initiator to the laminate and then removing the solvent from the composition. The solvent preferably comprises THF, for example the composition optionally comprises the aforementioned solvent-non-solvent pair of THF and MEK.

The tension applied to the laminate may be measured by, for example, a PT4000 S-type Tension/compression load cells available from PT Limited.

The composition used to make the discriminating layer preferably comprises a polymer, an inert solvent (i.e. a non-polymerisable solvent) and optionally an initiator. The inert solvent may be any solvent capable of dissolving the polymer used to form the discriminating layer. Suitability of the solvent is determined by the properties of the polymer and the concentration desired. Suitable solvents include water, $C_{5-10}$ alkanes, e.g. cyclohexane, heptane and/or octane; alkylbenzenes, e.g. toluene, xylene and/or $C_{10-16}$ alkylbenzenes; $C_{1-6}$ alkanols, e.g. methanol, ethanol, n-propanol, isopropanol, n butanol, sec-butanol, tert-butanol, n-pentanol, cyclopentanol and/or cyclohexanol; linear amides, e.g. dimethylformamide or dimethylacetamide; ketones and ketone-alcohols, e.g. acetone, methyl ether ketone, methyl isobutyl ketone, cyclohexanone and/or diacetone alcohol; ethers, e.g. tetrahydrofuran and/or dioxane; diols, preferably diols having from 2 to 12 carbon atoms, e.g. pentane-1,5-diol, ethylene glycol, propylene glycol, butylene glycol, pentylene glycol, hexylene glycol and/or thiodiglycol; oligo- and poly-alkyleneglycols, e.g. diethylene glycol, triethylene glycol, polyethylene glycol and/or polypropylene glycol; triols, e.g. glycerol and/or 1,2,6 hexanetriol; mono-$C_{1-4}$-alkyl ethers of diols, preferably mono-$C_{1-4}$-alkyl ethers of diols having 2 to 12 carbon atoms, e.g. 2-methoxyethanol, 2-(2-methoxyethoxy)ethanol, 2-(2 ethoxyethoxy)-ethanol, 2-[2-(2-methoxyethoxy)ethoxy] ethanol, 2-[2-(2-ethoxyethoxy)-ethoxy]-ethanol and/or ethyleneglycol monoallylether; cyclic amides, e.g. 2-pyrrolidone, N-methyl-2-pyrrolidone, N-ethyl-2-pyrrolidone, caprolactam and/or 1,3-dimethylimidazolidone; cyclic esters, e.g. caprolactone; sulphoxides, e.g. dimethyl sulphoxide and/or sulpholane; and mixtures comprising two or more of the foregoing, particularly a mixture comprising methyl ethyl ketone and tetrahydrofuran.

The discriminating layer preferably comprises a polyimide, cellulose acetate, polyethyleneoxide or polyetherimide, especially a polyimide comprising trifluoromethyl groups. A particularly preferred discriminating layer comprises a polyimide comprising groups of the Formula (1):

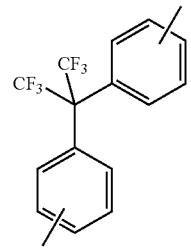

Formula (2)

Polyimides comprising trifluoromethyl groups may be prepared by, for example, the general methods described in U.S. Pat. Reissue No. 30,351 (based on U.S. Pat. No. 3,899,309), U.S. Pat. No. 4,717,394 and U.S. Pat. No. 5,085,676.

When the discriminating layer is cured after applying it to the gutter layer, the composition used to prepare the discriminating layer preferably comprises an initiator, preferably a thermal initiator or a photoinitiator. The initiator may be selected from those described above for the gutter layer.

The discriminating layer may be formed on the gutter layer by any suitable technique, for example by a process comprising any of the coating methods described above in relation to preparation of the gutter layer.

Optionally the composite membrane further comprises d) a protective layer located on the discriminating layer. The optional protective layer may be formed on the discriminating layer by any suitable technique, for example by a process comprising any of the coating methods described above in relation to preparation of the gutter layer.

The protective layer, when present, preferably is highly permeable to the gases or vapours that are to be separated. Preferably the protective layer comprises dialkylsiloxane groups.

The protective layer optionally has surface characteristics which influence the functioning of the composite membrane, for example by making the membrane surface more hydrophilic.

The composite membrane preferably has a pure water permeability at 20° C. of less than $6 \times 10^{-8}$ $m^3/m^2 \cdot s \cdot kPa$, more preferably less than $3 \times 10^{-8}$ $m^3/m^2 \cdot s \cdot kPa$.

The overall dry thickness of the composite membrane will typically be 20 to 500 µm, preferably from 30 to 300 µm.

The composite membrane is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

The composite membranes are particularly suitable for separating a feed gas containing a target gas into a gas stream rich in the target gas and a gas stream depleted in the target gas.

For example, a feed gas comprising polar and non-polar gases may be separated into a gas stream rich in polar gases and a gas stream depleted in polar gases. Thus the present invention provides a process for separating a feed gas comprising polar and non-polar gases into a gas stream rich in polar gases and a gas stream depleted in polar gases comprising bringing the feed gas into contact with a membrane according to the first aspect of the present invention.

In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, and $N_2$.

The target gas may be, for example, a gas which has value to the user of the composite membrane and which the user wishes to collect. Alternatively the target gas may be an undesirable gas, e.g. a pollutant or 'greenhouse gas', which the user wishes to separate from a gas stream in order to protect the environment.

The composite membranes are particularly useful for purifying natural gas (a mixture which comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha$ $CO_2/CH_4$)>20. Preferably the selectivity is determined by a process comprising exposing the membrane to a 13:87 mixture by volume of $CO_2$ and $CH_4$ at a feed pressure of 6000 kPa and a temperature of 40° C.

Preferably the composite membrane has a $CO_2/N_2$ selectivity (a $CO_2/N_2$)>35. Preferably the selectivity is determined by a process comprising exposing the membrane to $CO_2$ and $N_2$ separately at feed pressures of 2000 kPa and a temperature of 40° C.

While this specification emphasises the usefulness of the composite membranes of the present invention for separating gases, especially polar and non-polar gases, it will be understood that the composite membranes can also be used for other purposes, for example providing a reducing gas for the direct reduction of iron ore in the steel production industry, dehydration of organic solvents (e.g. ethanol dehydration), pervaporation and vapour separation and also for breathable apparel. The composite membranes of the present invention are particularly useful for refining methane from biogas, e.g. using a membrane/absorption hybrid method in conjunction with an absorption solution, for example, as described in JP-A-2007-297605.

According to a further aspect of the present invention there is provided a gas separation module comprising a composite membrane according to the first aspect of the present invention.

The module may take any convenient form, for example include spiral, hollow, pleat, tubular, plate and frame modules etc. are preferred.

The composite membranes of the present invention exhibit good flux and separation selectivity. They can endure bending and have a low tendency to form undesirable pin holes. The membranes are stable under a variety of conditions, including hot and humid conditions.

The invention is now illustrated by the following non-limiting examples in which all parts and percentages are by weight unless otherwise specified. ("Ex." means Example. "CEx." means Comparative Example. GL means gutter layer, DL means discriminating layer and PL means protective layer).

The following materials were used in the Examples:

PAN is a polyacrylonitrile L10 ultrafiltration membrane from GMT Membrantechnik GmbH, Germany (a porous support).

X-22-162C is crosslinking agent (a dual end reactive silicone having carboxylic acid reactive groups, a viscosity of 220 mm 2/s and a reactive group equivalent weight of 2,300 g/mol) from Shin-Etsu Chemical Co., Ltd. (MWT 4,600).

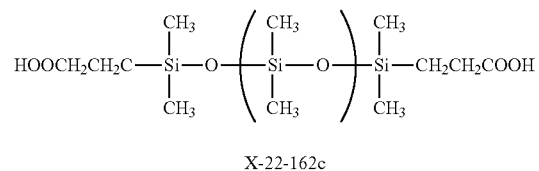

X-22-162c

DBU is 1,8-diazabicyclo[5.4.0]undec-7-ene from Sigma Aldrich.

UV9300 is SilForce™ UV9300 from Momentive Performance Materials Holdings. This is thermally curable copolymer comprising reactive epoxy groups and linear polydimethyl siloxane chains. Furthermore, this copolymer cures rapidly when irradiated with UV light in the presence of a photo-initiator.

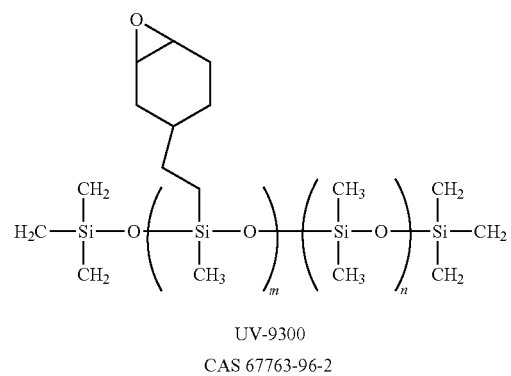

UV-9300

CAS 67763-96-2

I0591 4-isopropyl-4'-methyldiphenyliodonium tetrakis(pentafluorophenyl) borate ($C_{40}H_{18}BF_{20}I$) from Tokyo Chemical Industries N.V. (Belgium):

Ti(OiPr)₄ is titanium (IV) isopropoxide from Dorf Ketal Chemicals (MWT 284).
n-heptane is n-heptane from Brenntag Nederland BV.
MEK is 2-butanone from Brenntag Nederland BV.
MIBK is methylisobutyl ketone from Brenntag Nederland BV.
APTMS is 3-trimethoxysilylpropan-1-amine from Sigma Aldrich.
THF is tetrahydrofuran from Brenntag Nederland BV.
PI1 is 6FDA-TeMPD x/DABA y, x/y=20/80; obtained from Fujifilm Corporation, having the following structure:

poly([({2,3,5,6-tetramethyl-1,4-phenylenediame}-alt-{5,5'-[2,2,2-trifluoro-1-(trifluoromethyl)ethane-1,1-diyl]bis(isobenzofuran-1,3-dione)})-co-[{5-carboxylic-1,3-phenylenediame}-alt-{5,5'-[2,2,2-trifluoro-1-(trifluoromethyl)ethane-1,1-diyl]bis(isobenzofuran-1,3-dione)}]) obtained from Fujifilm Corporation.

All materials were used without further purification.

(A) Calculation of Ø

All thickness measurements were obtained using the following equipment:

Equipment: Ellipsometer model M-2000F from J.A. Woollam Co. Inc.
Lamp: Xenon.
Software: Windows V.A.S.E.32.
Settings: as model Cauchy is chosen for all layers.
Thickness substrate (bulk): 0.17 mm
Wavelength: all wavelengths (~240-1000 nm)
Measurement angles: 50-80° in steps of 5°.
Revs/meas.: 100.

The fitting software was used to determine the thickness of the layers as a function of refractive index.

$\bar{x}$—the Arithmetic Mean of N Measurements of the Thickness of the Discriminating Layer The thickness of the discriminating layer in nm was measured at N random locations (where N is at least 100) and the arithmetic average was calculated to give $\bar{x}$.

$x_{low\_meas}$ is the thickness in nm of an individual measurement of thickness within the N measurements.

The Number of Thickness Measurements (n) Where the $\bar{x} > x_{low\_meas} > 0$ The value of n was the number of thickness measurements within the N measurements which had a value less than the value of $\bar{x}$.

From the above measurements, Ø was calculated using Formula (1) described above and the results are shown in Table 4 below.

(B) Gas Flux

The flux of $CH_4$ and $CO_2$ through the composite membranes was measured at 40° C. and gas feed pressure of 6,000 kPa using a gas permeation cell with a measurement diameter of 3.0 cm and a feed gas composition of 13 v/v % CO2 and 87 v/v % CH4.

The flux of each gas was calculated based on the following equation:

$$Q_i = (\theta_{Perm} \cdot X_{Perm,i}) / (A \cdot (P_{Feed} \cdot X_{Feed,i} - P_{Perm} \cdot X_{Perm,i}))$$

Where:
$Q_i$=Flux of each gas (m³(STP)/m²·kPa·s)
$\theta_{Perm}$=Permeate flow (m³(STP)/s)
$X_{Perm,i}$=Volume fraction of each gas in the permeate
A=Membrane area (m²)
$P_{Feed}$=Feed gas pressure (kPa)
$X_{Feed,i}$=Volume fraction of each gas in the feed
$P_{Perm}$=Permeate gas pressure (kPa)

STP is standard temperature and pressure, which is defined here as 25.0° C. and 1 atmosphere (101.325 kPa).

(C) Selectivity

The selectivity ($\alpha_{CO2/CH4}$) for the composite membranes was calculated from $Q_{CO2}$ and $Q_{CH4}$ calculated above, based on following equation:

$$\alpha_{CO2/CH4} = Q_{CO2}/Q_{CH4}$$

(D) Measurement of Tension (N/m)

The tension may be applied to the porous support+gutter layer laminate by stretching the laminate. The tension may be measured using, for example, a PT4000 S-type Tension/compression apparatus available from PT Limited.

Gutter Layer Preparation: Preparation of Radiation-Curable Polymers PCP1

The components UV9300, X-22-162C and DBU were dissolved in n-heptane in the amounts indicated in Table 1 and maintained at a temperature of 95° C. for 168 hours to give partially cured polymer PCP1. PCP1 had an Si content (meq/g polymer) of 12.2 and the resultant n-heptane solution of PCP1 had a viscosity of 22.8 mPas at 25.0° C.

TABLE 1

Ingredients used to Prepare PCP1:
PCP1

| Ingredient | Amount (w/w %) |
|---|---|
| UV9300 (w/w %) | 39.078 |
| X-22-162C (w/w %) | 10.789 |
| DBU (w/w %) | 0.007 |
| n-Heptane (w/w %) | 50.126 |

Preparation of the Curable Composition G1

To make curable composition G1, the solution of PCP1 arising from the previous step above was cooled to 20° C. and diluted using n-heptane to give the PCP1 concentration indicated in Table 2 below. The solution was then filtered through a filter paper having a pore size of 2.7 μm. The photoinitiator I0591 and a metal complex (Ti(OiPr)$_4$) were then added to the filtrate in the amounts indicated in Table 2 to give curable composition G1. The amount of Ti(OiPr)$_4$ present in G1 corresponded to 105.6 μmol of Ti(OiPr)$_4$ per gram of PCP1. Also the molar ratio of metal:silicon in G1 was 0.0087.

Curable compositions G1 had the formulations shown in Table 2 below:

TABLE 2

Curable Composition G1
Curable Composition G1

| Ingredient | Amount (w/w %) in n-heptane |
|---|---|
| PCP1 | 5.0 |
| I0591 | 0.1 |
| Ti(OiPr)$_4$ | 0.15 |

Curable compositions G1 was used to prepare the gutter layer and/or the protective layer, as described in more detail below.

Step a) Formation of the Gutter Layer

Curable composition G1 was applied to a PAN (a porous support) by spin coating and subsequently cured using a Light Hammer LH10 from Fusion UV Systems fitted with a D-bulb with an intensity of 24 kW/m and dried. The average gutter layer thickness was determined by cutting through the PAN+gutter layer composite and measuring the thickness in several places from the surface of the PAN support outwards by SEM and calculating the average. The average gutter layer of thickness was found to be 400 nm.

Step b) Formation of the Discriminating Layer

The ingredients shown in Table 3 were mixed to prepare compositions D1 and D2:

TABLE 3

| Ingredient | D1 | D2 |
|---|---|---|
| PI1 | 1.5 | 1.5 |
| APTMS | 0.015 | 0.015 |
| MIBK | 4.50 | 4.50 |
| THF | 7.485 | 17.485 |
| MEK | 86.50 | 76.50 |

Laminates comprising porous support+gutter were stretched to tensions of 122.64 or 330.19 N/m, as indicated in Table 4 below. The compositions D1 to D2 were each independently applied to the tensioned porous support+gutter laminates, as indicated in Table 4 below, by spin coating in varying theoretical amounts (via coating flow) from 40 to 500 nm.

Step c) Protective Layer

In order to provide a protective layer, the radiation-curable composition G1 described in Table 2 was applied by spin coating to the PAN+gutter layer+discriminating layer composite membranes indicated in Table 4 arising from step b). The composition G1 was cured thereon using a Light Hammer LH10 from Fusion UV Systems fitted with a D-bulb with an intensity of 24 kW/m and dried.

TABLE 4

| | Porous support | Laminate Tension N/m | Gutter Layer | Discriminating Layer | Protective Layer | $\bar{x}$ (nm) | N | n | Sum (1 − 1/$X_{low\ meas}$) | φ | Selectivity$_\alpha$ $_{CO_2/CH_4}$ |
|---|---|---|---|---|---|---|---|---|---|---|---|
| CEx1 | PAN | 122.64 | — | D1 | — | 85 | 100 | 61 | 50.0 | 24.0 | 5.2 |
| CEx2 | PAN | 122.64 | — | D1 | G1 | 86 | 100 | 68 | 59.8 | 22.0 | 5.2 |
| CEx3 | PAN | 122.64 | G1 | D1 | G1 | 87 | 100 | 31 | 24.9 | 7.7 | 12.7 |
| Ex1 | PAN | 330.19 | G1 | D1 | G1 | 88 | 100 | 10 | 8.0 | 2.0 | 18.6 |
| Ex2 | PAN | 330.19 | G1 | D2 | G1 | 89 | 100 | 2 | 1.9 | 0.1 | 28.6 |
| Ex3 | PAN | 330.19 | G1 | D2 | — | 90 | 100 | 1 | 0.8 | 0.2 | 27.2 |
| CEx4 | PAN | 122.64 | G1 | D1 | G1 | 47 | 100 | 63 | 52.6 | 13.2 | 8.9 |
| Ex4 | PAN | 330.19 | G1 | D1 | G1 | 48 | 100 | 29 | 23.8 | 3.5 | 16.5 |
| Ex5 | PAN | 330.19 | G1 | D2 | G1 | 48 | 100 | 8 | 7.2 | 0.4 | 24.5 |
| CEx5 | PAN | 122.64 | G1 | D1 | G1 | 147 | 100 | 23 | 19.6 | 6.5 | 14.5 |
| Ex6 | PAN | 330.19 | G1 | D1 | G1 | 148 | 300 | 26 | 22.4 | 2.0 | 25.6 |
| Ex7 | PAN | 330.19 | G1 | D2 | G1 | 149 | 100 | 5 | 4.9 | 0.1 | 31.5 |
| CEx6 | PAN | 122.64 | G1 | D1 | G1 | 199 | 1000 | 246 | 234.3 | 3.1 | 31.5 |
| CEX7 | PAN | 330.19 | G1 | D2 | G1 | 199 | 100 | 14 | 13.0 | 2.4 | 30.1 |
| CEx8 | PAN | 122.64 | G1 | D1 | G1 | 500 | 100 | 9 | 8.6 | 2.4 | 33.5 |
| CEx9 | PAN | 330.19 | G1 | D2 | G1 | 500 | 500 | 10 | 8.7 | 1.4 | 33.0 |

Example calculations:
CEx1: φ = (85/(100 − 61) × (61 − 50) = 24.
Ex1: φ = (88/(100 − 2) × (10 − 8) = 2.

In Table 4, "Ex" means Example and "CEx" means Comparative Example.

The invention claimed is:

1. A process for preparing a composite membrane wherein the composite membrane comprises:

a) a porous support;
b) a gutter layer; and
c) a discriminating layer which satisfies Formula (1):

$$\emptyset = \frac{\bar{x}}{(N-n)}\left(n - \sum_{i=1}^{n}\left(1 - \frac{1}{x_{low_{meas}}}\right)\right) \quad \text{Formula (1)}$$

wherein:
Ø is <4;
$\bar{x}$ is the arithmetic mean of N measurements of the thickness of the discriminating layer and has a value of between 30 and 150 nm;
N is at least 100;
$x_{low\_meas}$ is the thickness in nm of an individual measurement of thickness within the N measurements;
$\bar{x} > x_{low\_meas} > 0$; and
n is the number of individual thickness measurements where
$\bar{x} > x_{low\_meas} > 0$,
the process comprising the step of applying the discriminating layer to a laminate comprising the porous support and the gutter layer, wherein a tension >200 N/m is applied to the laminate when the discriminating layer is applied thereto.

2. The process according to claim 1 wherein Ø is <2.5.

3. The process according to claim 1 wherein the discriminating layer is intermixed with the gutter layer.

4. The process according to claim 1 wherein the discriminating layer comprises a polyimide, cellulose acetate, polyethyleneoxide or polyetherimide.

5. The process according to claim 1 wherein the discriminating layer comprises a polyimide comprising trifluoromethyl groups.

6. The process according to claim 1 wherein the discriminating layer comprises a polyimide comprising groups of the Formula (2):

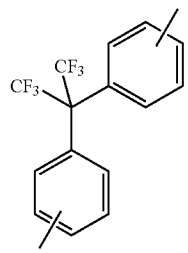

Formula (2)

7. The process according to claim 1 wherein a portion of the gutter layer is present within the support and a portion of the gutter layer is outside of the support and the following conditions are satisfied:
(i) the portion of the gutter layer outside of the support has an average thickness ($GL_e$) of 10 nm to 900 nm; and
(ii) the portion of the gutter layer present within the support has an average thickness ($GL_i$) of 10% to 350% of $GL_e$.

8. The process according to claim 7 wherein $GL_e$ is 400 to 900 nm.

9. The process according to claim 1 wherein $\bar{x}$ has a value of 40 to 100 nm.

10. The process according to claim 1 which has a dry thickness of 30 to 200 μm.

11. The process according to claim 1 wherein Ø is <2.5, the discriminating layer is intermixed with the gutter layer and the discriminating layer comprises a polyimide, cellulose acetate, polyethyleneoxide and/or polyetherimide.

12. The process according to claim 1 wherein a portion of the gutter layer is present within the support and a portion of the gutter layer is outside of the support and the following conditions are satisfied:
(i) the portion of the gutter layer outside of the support has an average thickness ($GL_e$) of 400 nm to 900 nm;
(ii) the portion of the gutter layer present within the support has an average thickness ($GL_i$) of 10% to 350% of $GL_e$;
(iii) $\bar{x}$ has a value of 40 to 100 nm; and
(iv) the composite membrane has a dry thickness of 30 to 200 μm.

13. The process according to claim 1 wherein a portion of the gutter layer is present within the support and a portion of the gutter layer is outside of the support and the following conditions are satisfied:
(i) the portion of the gutter layer outside of the support has an average thickness ($GL_e$) of 400 nm to 900 nm;
(ii) the portion of the gutter layer present within the support has an average thickness ($GL_i$) of 10% to 350% of $GL_e$;
(iii) $\bar{x}$ has a value of 40 to 100 nm;
(iv) the composite membrane has a dry thickness of 30 to 200 μm;
(v) Ø is <2.5;
(vi) the discriminating layer is intermixed with the gutter layer; and
(vii) the discriminating layer comprises a polyimide, cellulose acetate, polyethyleneoxide and/or polyetherimide.

14. The process according to claim 13 wherein the discriminating layer comprises a polyimide comprising trifluoromethyl groups.

15. The process according to claim 13 wherein the discriminating layer comprises a polyimide comprising groups of the Formula (2):

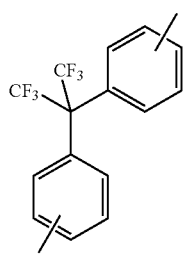

Formula (2)

* * * * *